United States Patent
Nakadaira et al.

(10) Patent No.: US 6,692,167 B2
(45) Date of Patent: Feb. 17, 2004

(54) MULTIFUNCTION APPARATUS AND METHOD FOR DISPLAY APPARATUS FOR MULTIFUNCTION APPARATUS

(75) Inventors: Hidemi Nakadaira, Tokyo (JP); Hidenobu Kanda, Tokyo (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

(21) Appl. No.: 10/323,640

(22) Filed: Dec. 20, 2002

(65) Prior Publication Data

US 2003/0170060 A1 Sep. 11, 2003

(30) Foreign Application Priority Data

Mar. 6, 2002 (JP) ........................................ 2002-060790

(51) Int. Cl.[7] .............................. B41J 5/30; B41J 11/44; G06F 15/00; G09G 5/00
(52) U.S. Cl. ........................... 400/61; 400/76; 358/1.1; 358/1.15; 345/173
(58) Field of Search ...................... 400/61, 76; 358/1.1, 358/504, 1.15; 345/173, 357, 341, 784, 854, 817, 830, 829, 767, 760, 764

(56) References Cited

U.S. PATENT DOCUMENTS

| | | | | |
|---|---|---|---|---|
| 5,553,211 A | * | 9/1996 | Uotani | 345/641 |
| 5,999,176 A | * | 12/1999 | Kamper | 345/787 |
| 6,020,887 A | * | 2/2000 | Loring et al. | 345/786 |
| 6,025,841 A | * | 2/2000 | Finkelstein et al. | 345/803 |
| 6,215,490 B1 | * | 4/2001 | Kaply | 345/788 |
| 6,246,407 B1 | * | 6/2001 | Wilks et al. | 345/803 |
| 6,292,188 B1 | * | 9/2001 | Carlson et al. | 345/854 |
| 6,438,574 B1 | * | 8/2002 | Nagashima | 709/102 |
| 6,590,594 B2 | * | 7/2003 | Bates et al. | 345/784 |
| 6,590,595 B1 | * | 7/2003 | Wagner et al. | 345/784 |
| 2002/0054364 A1 | * | 5/2002 | Asahi | 358/403 |
| 2002/0080195 A1 | * | 6/2002 | Carlson et al. | 345/853 |
| 2002/0109858 A1 | * | 8/2002 | Bruce | 358/1.15 |

* cited by examiner

*Primary Examiner*—Stephen R. Funk
*Assistant Examiner*—Wasseem H. Hamdan
(74) *Attorney, Agent, or Firm*—Greenblum & Bernstein, P.L.C.

(57) ABSTRACT

The present invention provides a plurality of destination screens having a plurality of pages, in which a plurality of destination selection keys are displayed. The destination screens are displayed in layers, each screen having a tag to select a desired destination screen. When a specific tag is selected, a page of the corresponding destination screen with a registered destination selection key is displayed. When page scroll key are pressed, the registered destinations can be searched as each page of the destination screens is scrolled in the ascending/descending order. When no more pages can be scrolled in one destination screen, another destination screen is displayed, instead of terminating the operation. Therefore, it is not necessary to perform a separate operation to switch to another screen, when no more pages can be scrolled by pressing a page scroll key. Accordingly, it is possible to reduce the operator's burden to find a desired destination, thereby improving the convenience of the operation.

12 Claims, 18 Drawing Sheets

MULTIFUNCTION APPARATUS AND METHOD FOR DISPLAY APPARATUS FOR MULTIFUNCTION APPARATUS

BACKGROUND OF THE INVENTION

1. Field of the Invention

This invention relates to a multifunction apparatus and a method for a display apparatus for the multifunction apparatus.

2. Description of Related Art

In recent years, multifunction apparatuses having printer/facsimile functions added to copies are becoming very popular. In addition to the printer/facsimile functions, scanner functions have been added to some multifunction apparatuses. The following descriptions will be made by using multifunctional printers as examples of the multifunction apparatuses.

However, the conventional technologies have the following problem. In order to have as many selections of destinations available on one display, many layers of screens are displayed. Therefore, an operator has to perform a burdensome procedure to scroll many screens in order to find a desired destination.

SUMMARY OF THE INVENTION

The present invention addresses the above-described problem. The purpose of the invention is to provide a multifunctional printer and control method for a display apparatus for the printer, that can lighten the burden of the operator to find a desired destination and improve the convenience of the use, even when many screens of pages are used on a display.

In order to solve the above problem, this invention provides a multifunctional printer that displays a destination select key on a screen. This destination select key can program destinations for forwarding an image from the multifunctional printer. The multifunctional printer has a display that includes a plurality of destination screens to display one of a destination selection pages (each page including the destination select key), displays the destination screens in a plurality of layers, and displays previous/next page scroll keys for scrolling a plurality of destination selection pages. The multifunctional printer also has a controller that scrolls pages having the destination select keys, in the ascending order, among a plurality of destination selection pages, when the previous page scroll key is pressed, and that scrolls pages having the destination select key, in the descending order, among the plurality of destination selection pages, when the next page scroll key is pressed, in order to enable the display to display the scrolled destination selection page having the destination select key.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 12($b$) is a previous page of FIG. 12($a$);

FIG. 16($b$) illustrates a display for scanning a document in a landscape direction;

FIG. 18($b$) illustrates a state where two thirds of the document is scanned; and FIG. 18($c$) illustrates a state where the entire document is scanned.

DETAILED DESCRIPTION OF PREFERRED EMBODIMENTS

The embodiment of the present invention is explained in the following, in reference to the above-described drawings.

Figure 1:
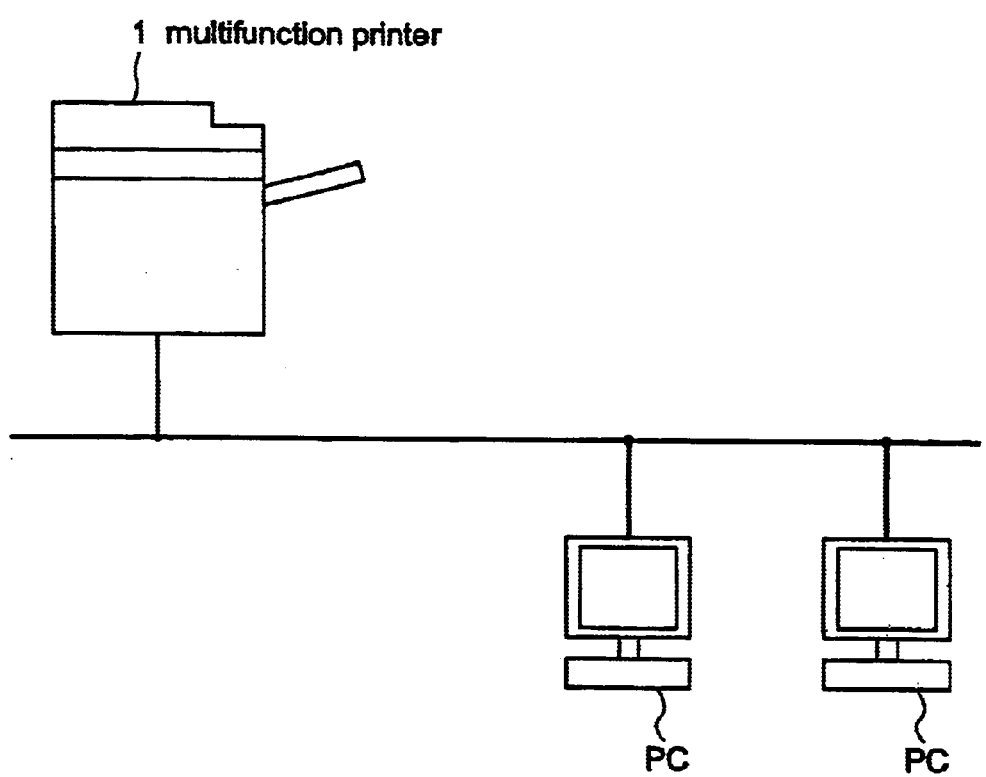
FIG. 1 is a schematic view illustrating a multifunctional printer according to the embodiment of the present invention and a plurality of personal computers that are mutually connected via a LAN.

FIG. 1 is a schematic view illustrating a state where multifunctional printer 1 according to the embodiment of the present invention and a plurality of personal computers (PCs) are mutually connected via a LAN. Accordingly, one multifunctional printer 1 and a plurality of PCs can mutually exchange signals. Multifunctional printer 1 has copier, printer, facsimile, and scanner functions. It is not necessary to have the entire functions, however, the multifunctional printer 1 according to the embodiment of the present invention has at least a scanner function in the following illustration.

Figure 2:
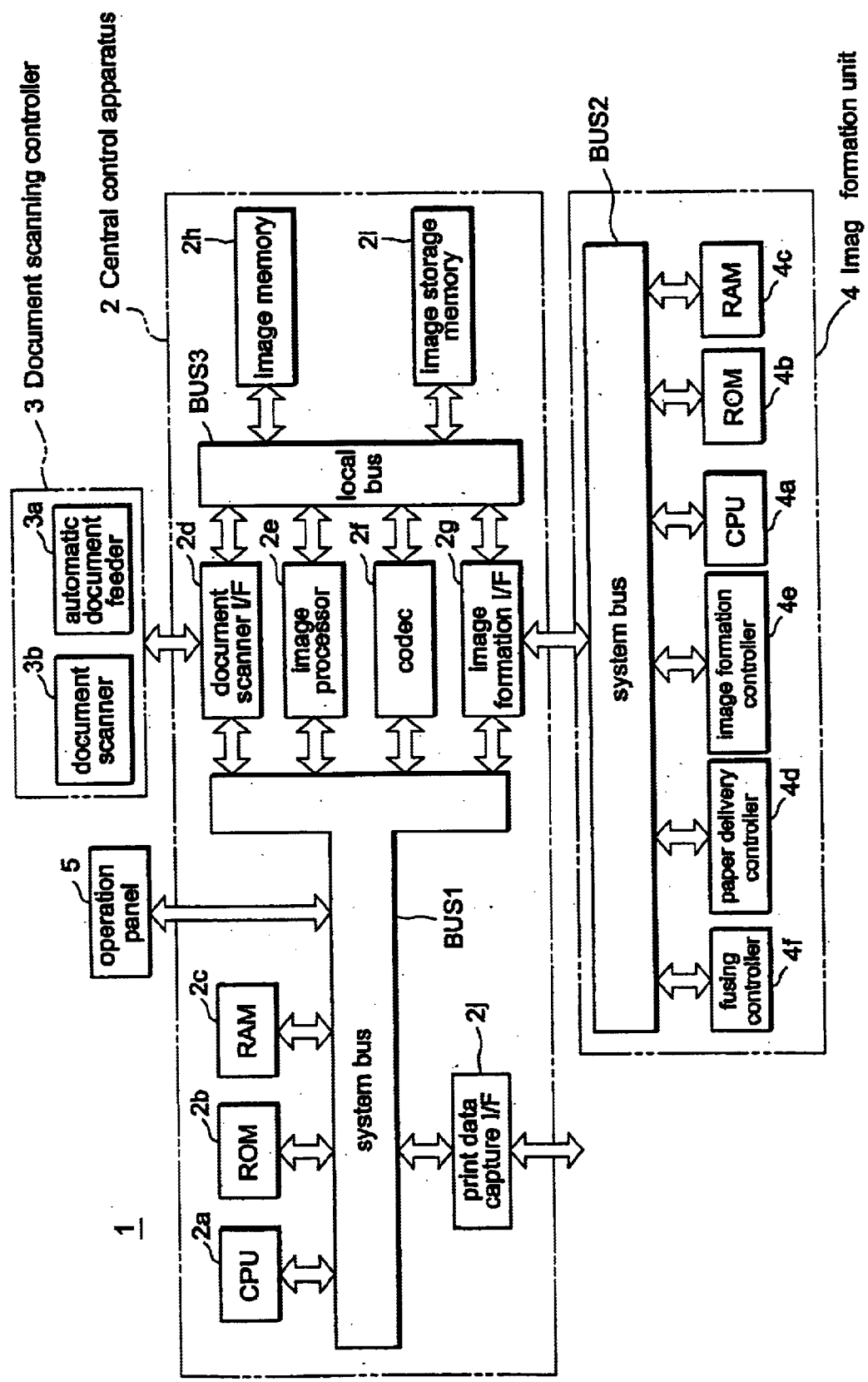
FIG. 2 is a block diagram illustrating a control of the multifunctional according to the embodiment of the present invention.

FIG. 2 is a block diagram illustrating the functions of multifunctional printer 1. Multifunctional printer 1 includes central processing apparatus 2 that is a forwarding/controlling unit and controls the entire multifunctional printer, document scanning controller 3 that scans a document, image formation unit 4 that forms an image on recording paper, and control panel 5 that is a display unit/apparatus and an input/output unit for an operator.

Central control apparatus 2 includes CPU 2$a$, ROM 2$b$, and RAM 2$c$, all of which mutually exchange signals via system bus BUS1. ROM 2$b$ stores an operational program of CPU 2$a$, while RAM 2$c$ stores work area and the like of CPU 2$a$.

Document scanning controller 3 includes automatic document feeder 3$a$ that automatically feeds a document, and document scanner 3b. In addition, image formation unit 4 has CPU 4a, ROM 4b, and RAM 4c, all of which mutually exchange signals via system bus BUS2. Image formation unit 4 also includes paper delivery controller 4d that delivers paper retrieved from a paper tray, image formation controller 4e that forms an image, and fusing controller 4f that controls toner fusing.

Within central processing apparatus 2, document scanner interface (I/F) 2d, image processor 2e, codec 2f, and image formation I/F 2g are connected to system bus BUS1. Document scanner I/F 2d connects document scanning controller 3 and system bus BUS1, and edits the scanned image data. Image processor 2e is an image processing circuit that enlarges/reduces the size of image data and/or rotates the data at an arbitrary degree. Codec 2f performs encoding/decoding processes on image data. Image formation I/F 2g exchanges image data of recording image between central processing apparatus 1 and image formation unit 4.

These document scanning I/F 2d, image processor 2e, codec 2f, and image formation I/F 2g are connected to image memory 2h and image storage memory 2i via local bus BUS3. Image memory 2h stores image data encoded by codec 2f. Further, print data capturer I/F 2j is connected to system bus BUS1. This print data capturer I/F 2j exchanges print data with a PC via the LAN.

Next, a scanning process of multifunctional printer 1 is illustrated as follows. In this scanning process, a document is set in multifunctional printer 1, and the scanned image is transmitted to a specified destination PC. As illustrated in a flowchart of FIG. 3, a destination process is performed at first in order to select a transmitting destination of an image at step ST1. This destination process is illustrated using a flowchart of FIG. 4. In this state, touch panel 6, which is included in the above-described operation panel 5, displays a destination screen as a first screen illustrated in FIG. 5.

Figure 4:
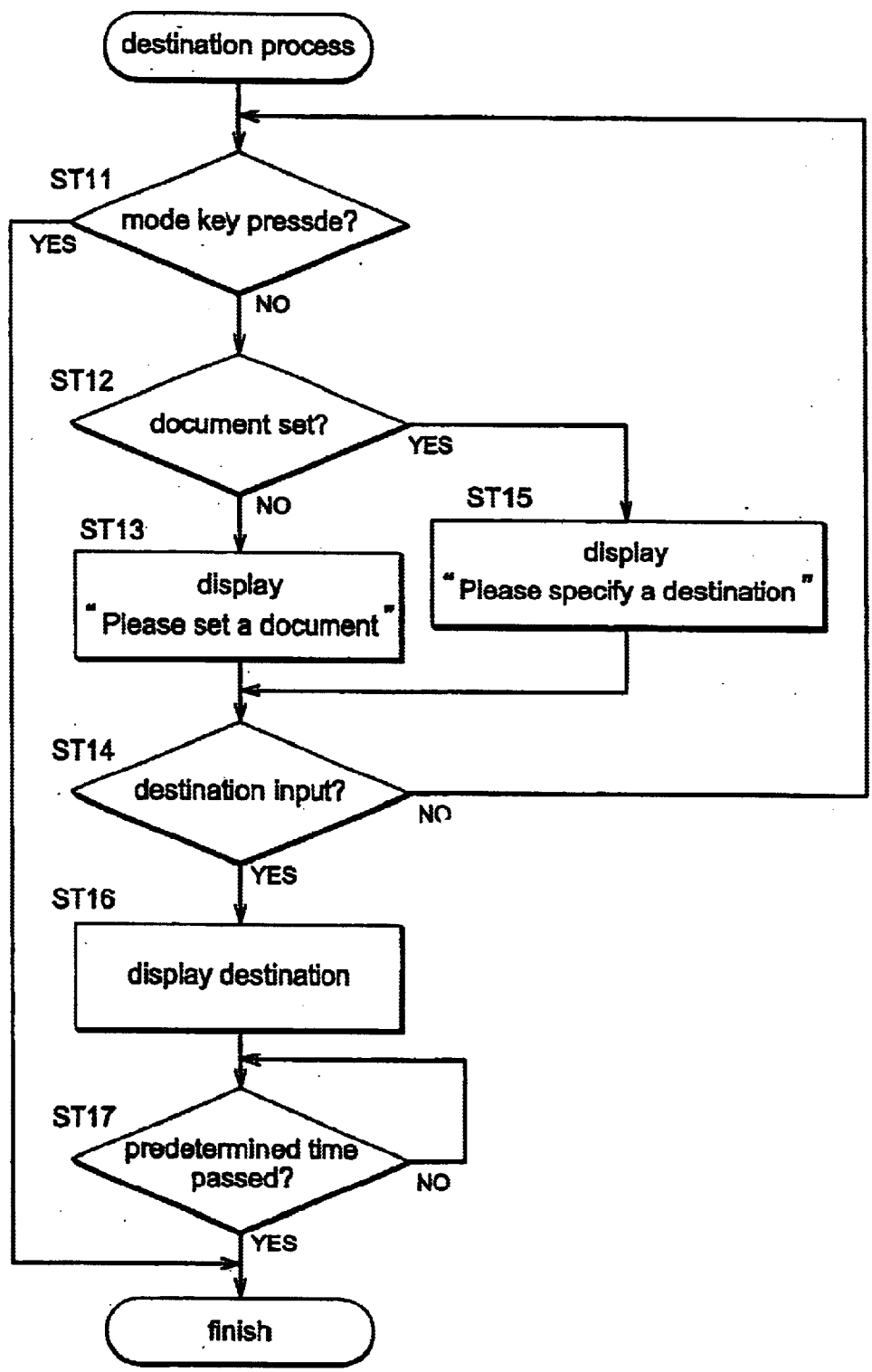
FIG. 4 is a flowchart illustrating a destination process.

It is checked whether mode key 11 is pressed at step ST11 of FIG. 4. This mode key 11 switches between a destination process mode and a document display process mode. When mode key 11 is pressed at step ST11, selecting not to perform the destination process mode, the flow is terminated. When mode key 11 is not pressed at step ST11, the control proceeds to step ST12.

At step ST12, it is checked whether a document is set. A location sensor used for copiers and the like can perform this process. When it is determined that a document is not set at step ST12, the control proceeds to step ST13, where a message "please set a document" is displayed, and proceeds to step ST14. When it is determined that a document is set at step ST12, the control proceeds to step ST15, where a message "please select a destination" is displayed, and proceeds to step ST14.

At step ST14, it is checked whether a destination is input. The destination input process can be performed, for example, from the destination screen shown in FIG. 5, by pressing a desired tag 12, which is in the alphabetical order, and by pressing a desired destination select key 13, among the screen of a plurality of destination select keys 13 corresponding to the chosen tag 12. In addition, alphabets displayed on tag 12 in the figure represent the initial letters of the destination, whereas "FAVORITE" on tag 12 is a prioritized frequently-used destination screen.

Figure 5:
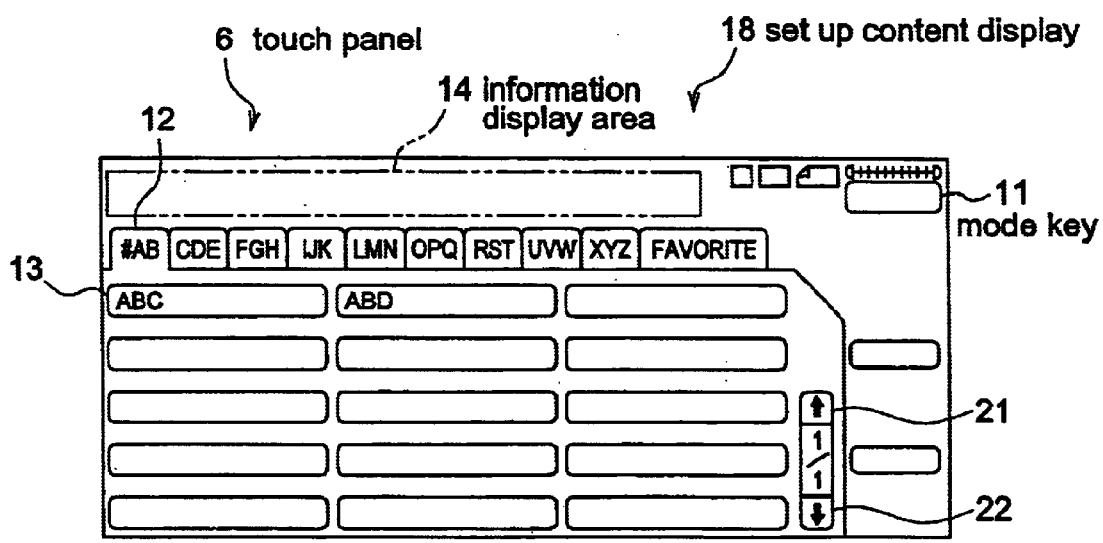
FIG. 5 illustrates a destination screen.

The destination screen of FIG. 5 can be switched to display a document direction display screen as the second screen. Accordingly, it is possible to display as many destinations as possible, using almost the entire display of touch panel 6. In the example shown in FIG. 5, twelve destinations in a 4×3 format are displayed at once. Since there are many destinations displayed at once, it is easy to select a destination. Especially, since multifunctional printer 1 are used on a network where many PCs are connected, it is possible to effectively select a destination in order to forward a scanned image by a scanner.

Figure 6:
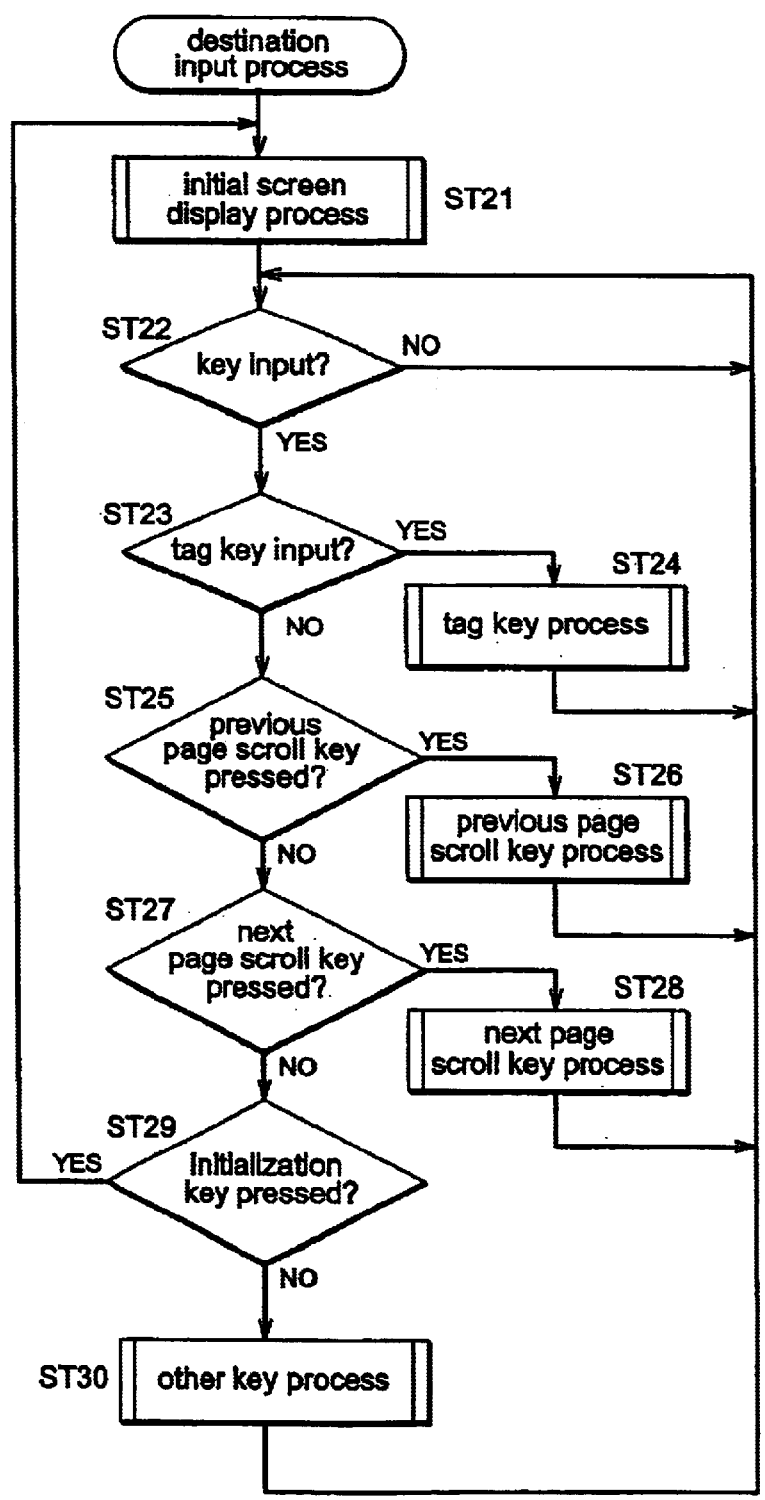
FIG. 6 is a flowchart illustrating a destination input process.
Figure 7:
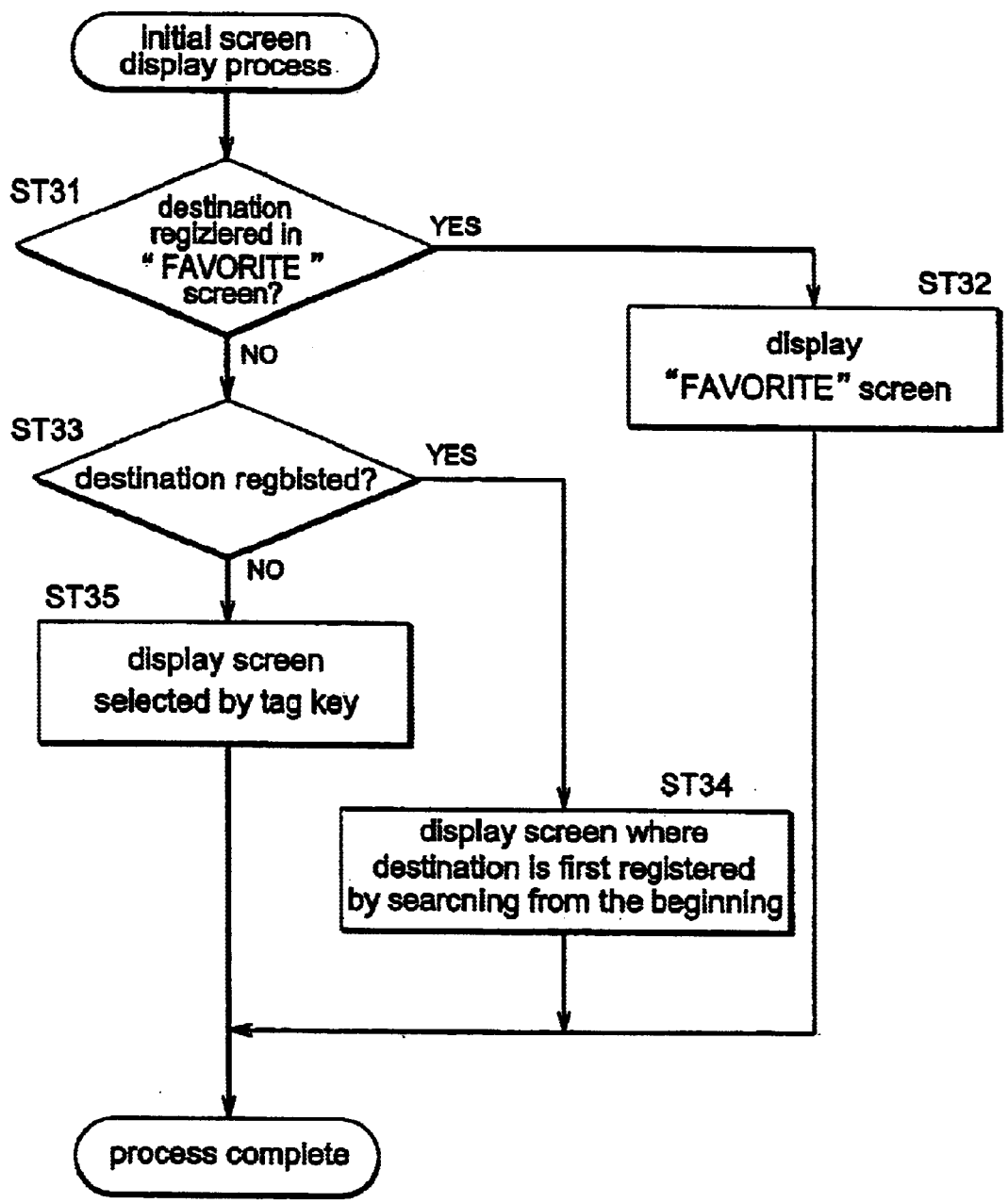
FIG. 7 is a flowchart illustrating an initial screen display process.
Figure 8:
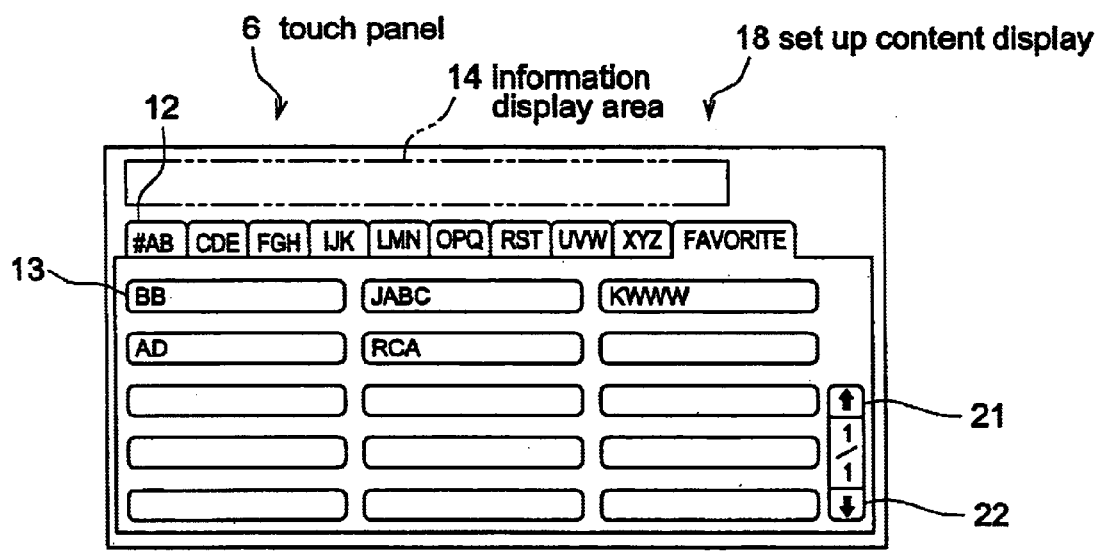
FIG. 8 illustrates a "FAVORITE" destination screen.

Next, a destination input process at step ST14 is illustrated. This destination input process is performed based on a flowchart illustrated in FIG. 6. First, an initial screen display process is performed for the destination screen at step ST21 in the figure. A flowchart in FIG. 7 is used to explain the initial screen display process. At step ST31 in the figure, it is checked whether a destination is registered in the destination select key 13 within the "FAVORITE" screen of tag 12, as a prioritized destination screen. When a destination is registered, the control proceeds to step ST32. As shown in FIG. 8, "FAVORITE" screen of tag 12 is displayed, which completes the initial screen display process of the destination screen. In this figure, five destination select keys 13 are registered as destinations.

When it is determined that no destination is registered at step ST31, the control proceeds to step ST33 to check whether a destination select key with a registered destination can be found in any other pages. When a destination select key with a registered destination is found, the control proceeds to step ST34. Then, the control searches the registered destination from the front destination screen ("#AB" screen of tag 12), and displays the destination screen with the destination select key having the first found registered destination (e.g., FIG. 5), which competes the display process. When it is determined that no destination select key having the registered destination is found, the control proceeds to step ST35. Then, the screen selected by the tag key (tag 12) (e.g., the first destination screen) is displayed, which completes the display process.

Therefore, in order to display a destination screen, registered destination select key is searched and displayed in the order of the priority destination screen and a plurality of destination screens. When there is no destination registered in a destination select key in any destination screen, the first destination screen from a plurality of screens is displayed. Accordingly, it is possible to immediately determine that no destination is registered, from an empty display at the first destination screen. Further, it is not necessary to scroll every page when there is no registered destination input, thereby largely reducing the operator's workload and making the process more convenient for the operator.

Moreover, upon scrolling screen displays, screens without registered destinations are skipped, instead of displaying every previous/next screen page. Since only screens with registered destinations are displayed, it is possible to reduce the burden of scrolling through every screen until a screen with a registered destination is found. Accordingly, it is possible to largely reduce the workload of the operator to find a desired destination, even when many layers of destination screens are displayed, thereby further improving the convenience in the operation.

At the next step ST22, it is checked whether there is any key input (a key being pressed at touch panel 5). When there is no key input, step ST22 is repeated. When there is a key input, the control proceeds to step ST23 where it is determined whether a tag key (tag 12) is pressed. It is noted that a key being "pressed" in this invention can actually just be "touched" in the operation.

When it is determined that a tag key is pressed at step ST23, the control proceeds to step ST24 to perform a tag key process. This tag key process is explained using FIG. 9. First, at step ST41, it is checked whether a tag key (tag 12) within the currently displayed destination screen is pressed. When the key is not pressed, the control proceeds to step ST42 where the destination screen corresponding to the pressed tag key (at step ST23) is selected. At the next step ST43, the first page of the destination screen is displayed, which completes the tag key process. For example, when "IJK" of tag 12 is pressed, the display will be shown as in FIG. 10. When all destination select keys 13 are registered in the first page, the second page is added to create more space for the registration.

Since the above-described tag key process is provided, it is possible to display the first page among a plurality of pages within the destination screen, instead of just displaying the destination screen corresponding to the selected tag 12, at a screen displayed in the very front.

When the tag key process is completed at step ST24, the control returns to step ST22. When it is determined that a tag key is not pressed at step ST23, the control proceeds to step ST25, where it is checked whether previous page scroll key 21 is pressed. When it is determined that previous page scroll key 21 is pressed, the control proceeds to step ST26 to perform a previous page scroll key process.

Figure 11:
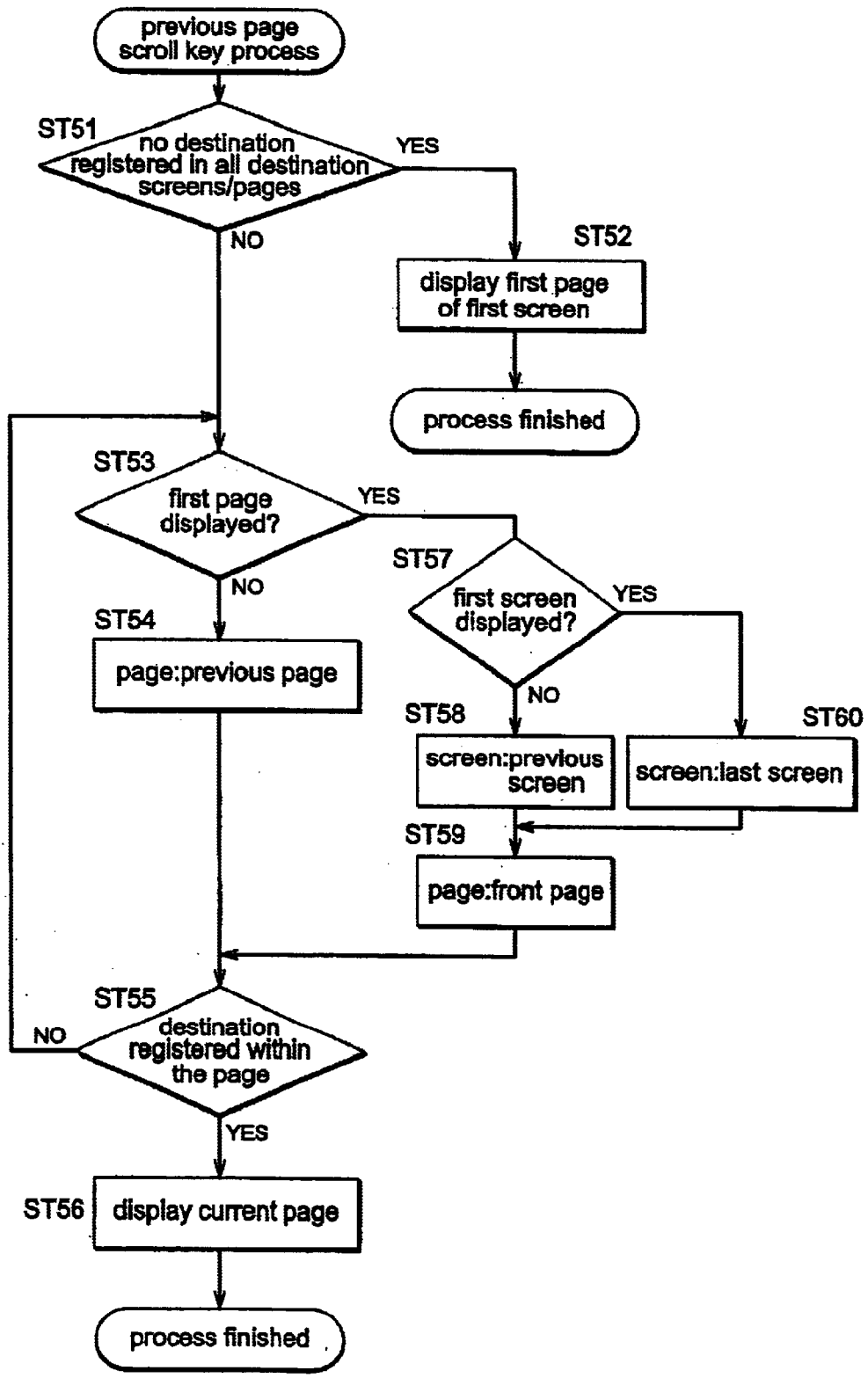
FIG. 11 is a flowchart illustrating a previous page key process.

The previous page scroll key process is explained using FIG. 11. At step ST51, it is checked whether all destination screens and pages have destination select keys 13 with registered destinations. When no destination is registered, the control proceeds to step ST52 to display the first page of the first destination screen (destination screen "#AB" of tag 12), which completes the key process.

Figure 12A:
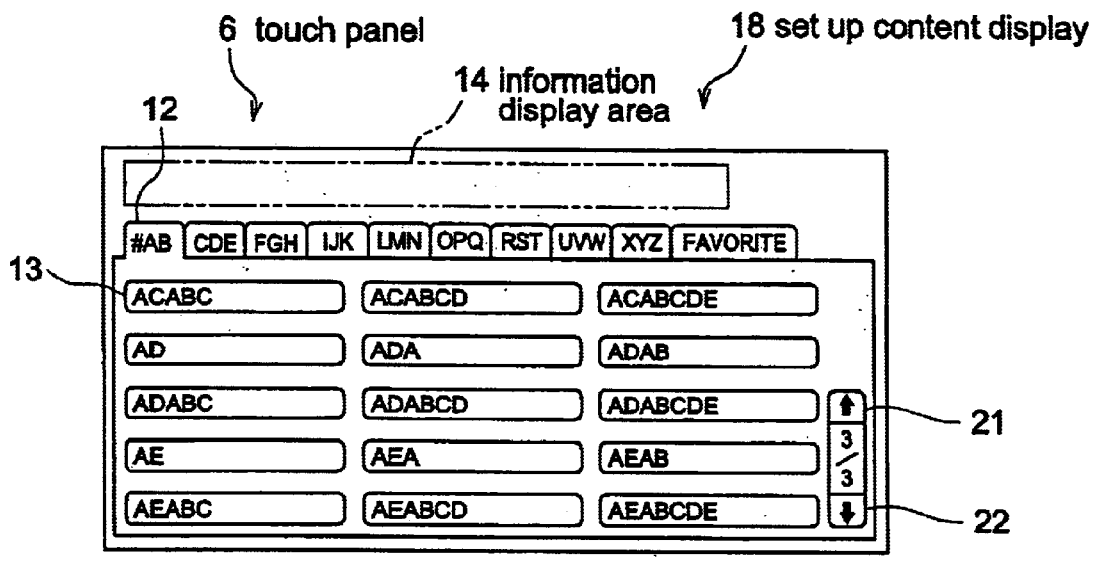
FIG. 12($a$) illustrates a mid page.
Figure 12B:
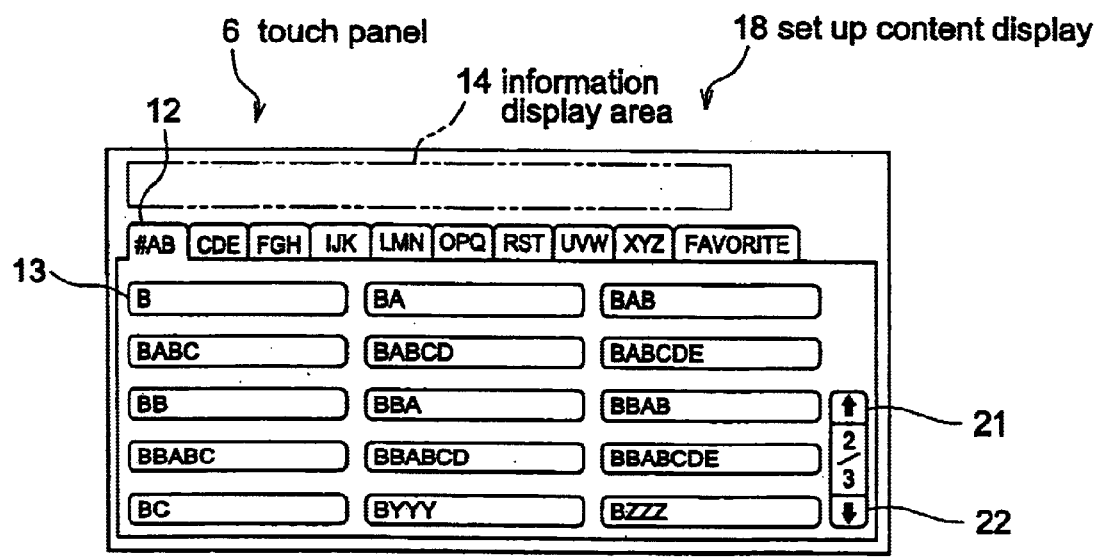

When a destination select key 13 with a registered destination is found at step ST51, the control proceeds to step ST53, where it is checked whether the first page is displayed. When the first page is not displayed, the control proceeds to step ST54 in order to display the previous page. For example, when the third page is displayed in destination screen "#AB" of tag 12, as illustrated in FIG. 12(a), the previous page (the second page of destination screen "#AB" of tag 12) is displayed as illustrated in FIG. 12(b).

At the next step ST55, it is checked whether the previous page has a destination select key 13 with a registered destination. When a destination select key 13 with a registered destination is not found, the control returns to step ST53. When it is found, the control proceeds to step ST56. At step ST56, the current page (in the above example, FIG. 12(b)), where a destination select key 13 with a registered destination is found at step ST55, is displayed, which completes the page scroll key process.

When it is determined that the first page is displayed at step ST53, the control proceeds to step ST57, where it is checked whether the first destination screen is displayed. When the fist destination screen is not displayed, the control proceeds to step ST58. At step ST58, since the first page of a middle destination screen is scrolled back, the previous destination screen is displayed. For example, when destination screen "IJK" of tag 12 is displayed, destination screen "FGH" of tag 12 will be displayed.

When it is determined that the first destination screen is displayed at step ST57, the control proceeds to step ST60. Since the first destination screen ("#AB" of tag 12) is displayed, the last screen as a previous screen (destination screen "XYZ" of tag 12 in the figure) is chosen. Accordingly, destination screens are scrolled as a loop in the ascending order. At the next step ST59 following steps ST58 and ST60, the first page of the destination screen (previous destination screen) is displayed. Then, the control proceeds to step ST55. The following page process is the same as the description illustrated at steps ST55 and ST56.

When the previous page scroll key process of step ST26 is completed, the control returns to step ST22. When it is determined that previous page scroll key 21 is not pressed at step ST25, the control proceeds to step ST27. At step ST27, it is checked whether next page scroll key 22 is pressed. When it is determined that next page scroll key 22 is pressed, the control proceeds to step ST28, where the next page scroll key process is performed.

Figure 13:
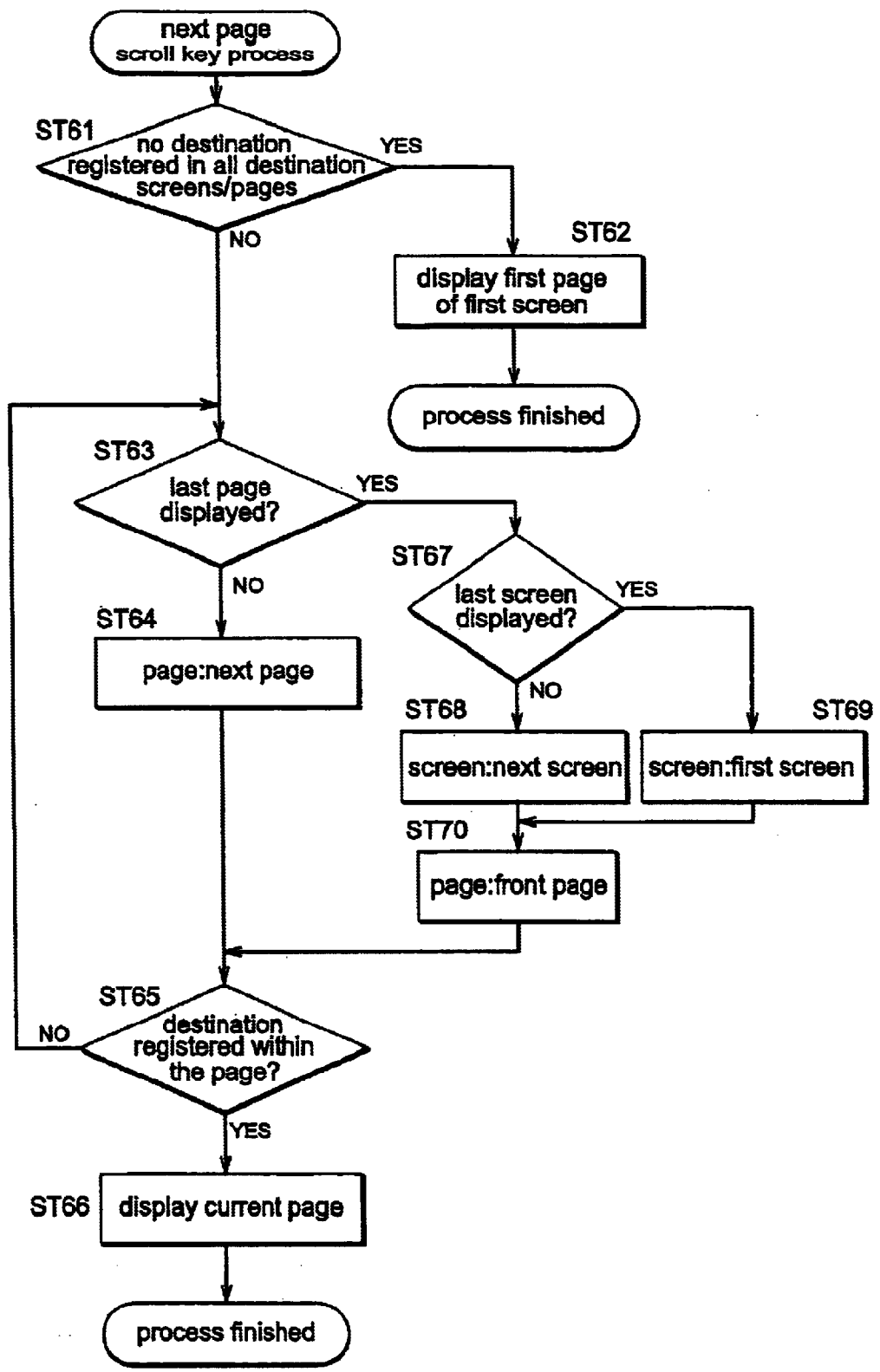
FIG. 13 is a flowchart illustrating a next page key process.

FIG. 13 is used to illustrate the next page scroll key process. It is noted that this next page scroll key process has the same process as in the previous page scroll key process. Therefore, basically, "previous page" can be replaced by "next page", and "previous screen", by "next screen" to illustrate a flowchart for the next page scroll key process. Since steps displayed with the same first digits in FIG. 13 perform the same process as in FIG. 11 (e.g., step ST51 corresponds to step ST61), detail illustrations are omitted except the parts that are not similar.

At step ST63, it is checked whether the last page is displayed. When the last page is not displayed, the control proceeds to step ST64 to perform the process of steps ST64–ST66, which completes the next page scroll key process.

When it is determined that the last page is being displayed at step ST63, the control proceeds to step ST67 to check whether the last destination screen is being displayed. When the last destination screen is not being displayed, the control proceeds to step ST68, where the next destination screen is displayed. Then, the control proceeds to step ST69. For example, when destination screen "FGH" of tag 12 is displayed, it is replaced by destination screen "IJK" of tag 12.

When it is determined that the last destination screen is being displayed at step ST67, the control proceeds to step ST70. Since last destination screen ("XYZ" of tag 12) is being displayed, the first screen will be chosen as the next screen (destination screen "#AB" of tag 12 in the figure). Accordingly, destination screens are scrolled as a loop in the descending order. At the next step ST69 following steps ST68 and ST70, the first page of the destination screen (next destination screen) is displayed. Then, the control proceeds to step ST65 to execute the process for steps ST65 and ST66.

In these page scroll key processes, when the previous page is scrolled from the first page of each destination screen, screens with registered destinations are scrolled in the ascending order, to display the searched pages. When the next page is scrolled from the last page of each destination screen, on the other hand, screens with registered destinations are scrolled in the descending order, to display the searched pages. Since another screen is displayed even if no page can be scrolled in one screen, instead of stopping the process, it is not necessary to perform a separate operation from the page scroll key in order to switch to another screen. Accordingly, even when many layers of screens are displayed, it is possible to reduce the operator's burden to find a desired destination, thereby improving the convenience of the operation.

Moreover, when switching display screens, screens without registered destinations are skipped, instead of displaying each screen before/after the current screen, so that only destination screens having registered destinations are displayed. Therefore, it is possible to omit the burden of scrolling every screen until the screen with the registered destination is found. Accordingly, even when many layers of screens are displayed, it is possible to largely reduce the operator's burden to find a desired destination, thereby improving the convenience of the operation.

In addition, another destination screen is displayed even if no page can be scrolled in one screen, instead of stopping the process. For example, even when it is not possible to scroll pages from page scroll keys 21 and 22, it is not necessary to leave page scroll keys 21 and 22, and to perform a separate operation, in order to switch to another screen. Accordingly, even when many layers of screens are displayed, it is possible to reduce the operator's burden to find a desired destination, thereby improving the convenience of the operation.

Furthermore, it is possible to omit the process of pressing previous page scroll key 2 many times, when the first page needs to be displayed after displaying a page later than the second page. Accordingly, even when many layers of screens are displayed, it is possible to reduce the operator's burden to find a desired destination, thereby improving the convenience of the operation.

When the next page scroll key process of step ST27 is completed, the control returns to step ST22. When it is determined that previous page scroll key 22 is not pressed at step ST27, the control proceeds to step ST29. At step ST29, it is checked whether an initialization key (not shown in the figure) is pressed. When it is determined that the initialization key is pressed, the control proceeds to step ST21 to perform the initialization screen display process. When it is determined that the initialization key is not pressed, the control proceeds to step ST30, where another key process is performed. Then, the control returns to step ST22.

Figure 14:
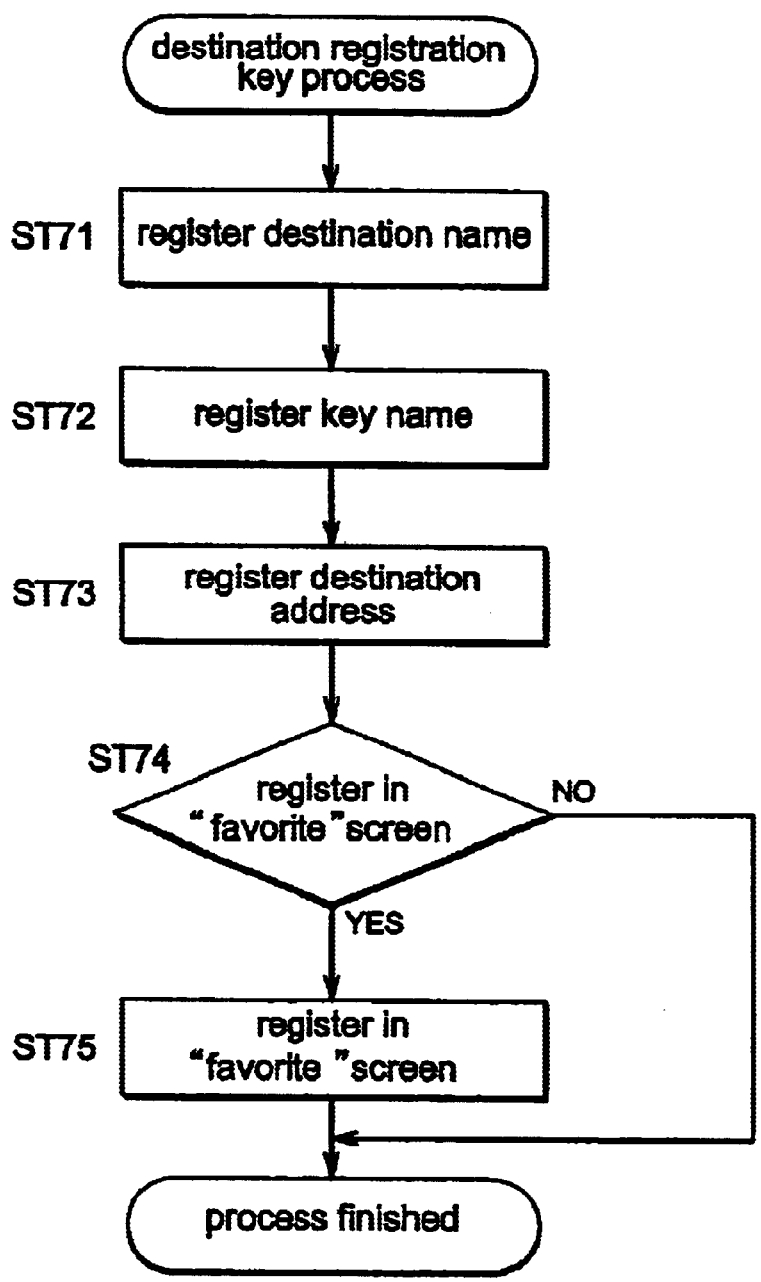
FIG. 14 is a flowchart illustrating a destination registration key process.

One example of another key process is a destination registration key process, which is illustrated using the flowchart of FIG. 14. First, by pressing a destination registration key (not shown), a registration screen for registering in the destination select key (similar to the screen of FIG. 5) is displayed. At step ST71, a destination name is registered. This can be performed by a key input, through numeric keys having assigned alphabets in the operation panel 5.

In the next step ST72, registration for a key name to be displayed on destination select key 13 is performed. This key name can be an abbreviated name, while the above destination name can be a formal name. At step ST73, the destination address is registered. In the example used in FIG. 14, a PC address connected to the LAN is registered.

At step ST74, it is checked whether the destination should be registered in the prioritized "FAVORITE" screen. This can be checked from a key entry, the key being provided in the registration screen as a destination registration key for the "FAVORITE" screen. When the registration in the "FAVORITE" screen is chosen, the control proceeds to step ST75. When not selected, the destination registration key process is completed. At step ST75, the registration item is automatically registered into the "FAVORITE" screen. Even when a destination is registered in the "FAVORITE" screen, it is also registered in the alphabetized destination screen.

When no destination is input at step ST14 (not destination is selected), the control returns to step ST11 and the steps between ST11 and 14 are repeated. When it is determined that a destination is input, the control proceeds to step ST16 to display the selected destination. The destination can be displayed on information display area 14.

At the next step ST17, it is checked whether a predetermined time period has passed. When a predetermined time period has passed, the destination process mode is completed. This predetermined time period is provided so that the user can view and check the selected destination.

Figure 3:
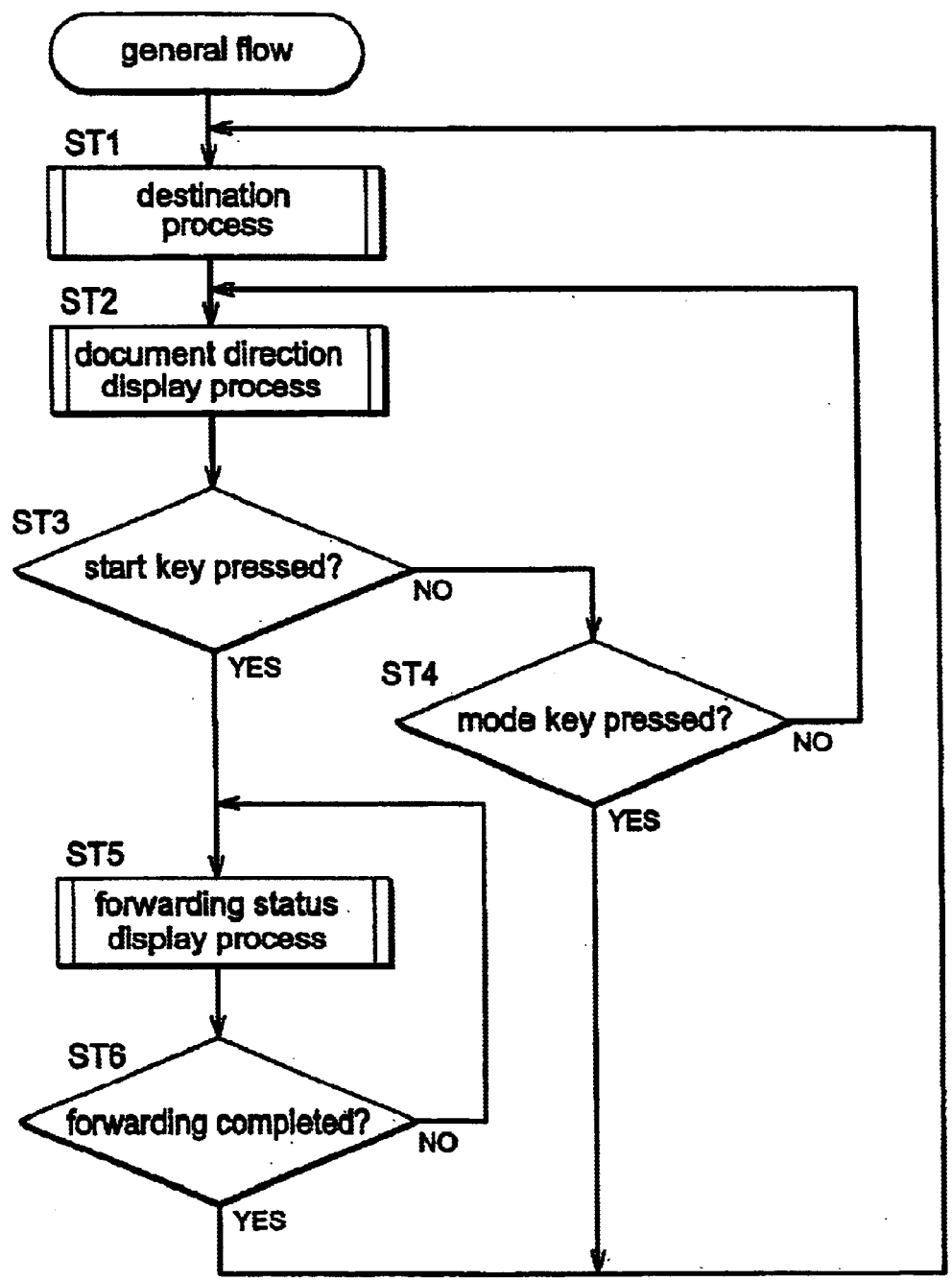
FIG. 3 is a flowchart illustrating a control based on the present invention.
Figure 15:
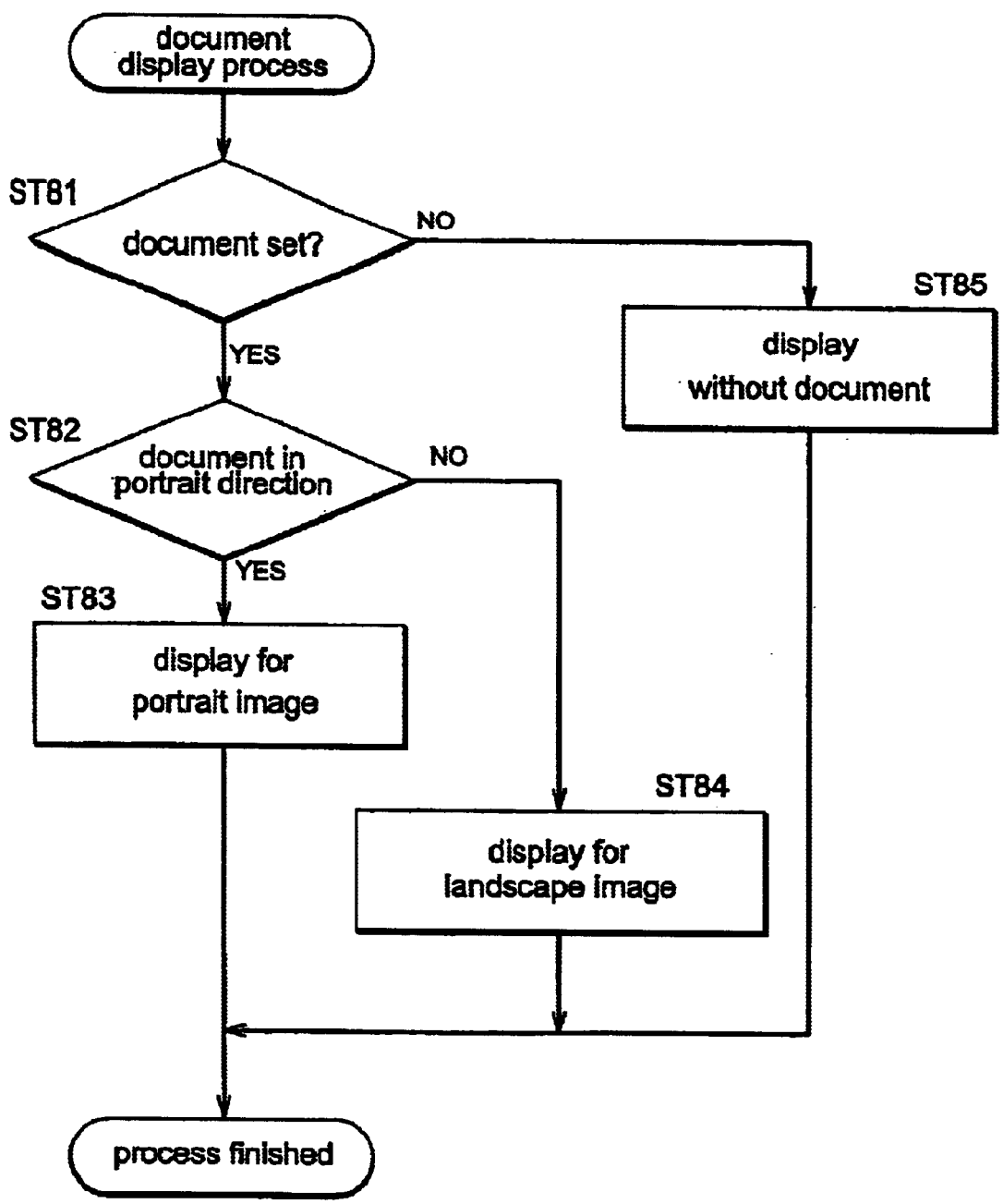
FIG. 15 is a flowchart illustrating a document display process.

When the destination process is completed, the control proceeds to step ST2 of FIG. 3, in order to perform a document display process mode. The document display process is illustrated as follows, using a flowchart of FIG. 15. First, at step ST81 of FIG. 15, it is checked whether a document is set. When it is determined that a document is set, the control proceeds to step ST82 to check whether the document is in a portrait direction. When the document is in the portrait direction, the control proceeds to step ST83. At step ST83, touch panel 6 displays a document direction display screen as the second screen illustrated in FIG. 16(a). At a predetermined location of the document direction display screen, document image 15a indicating a portrait direction is displayed, while displaying forwarding image 17a indicating a portrait direction in parallel on the same screen, which completes the document direction display process.

Figure 16B:
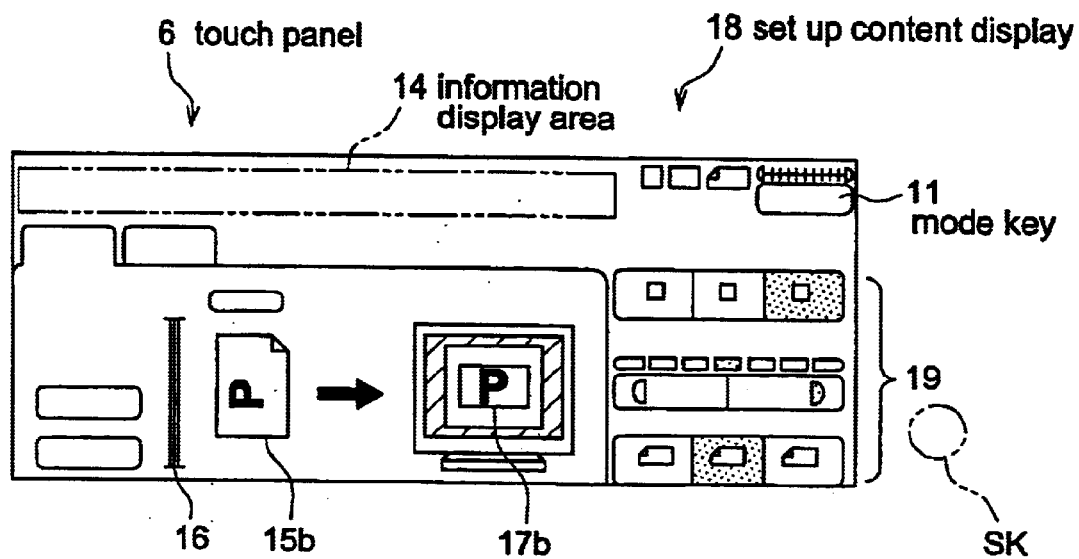
Figure 17:
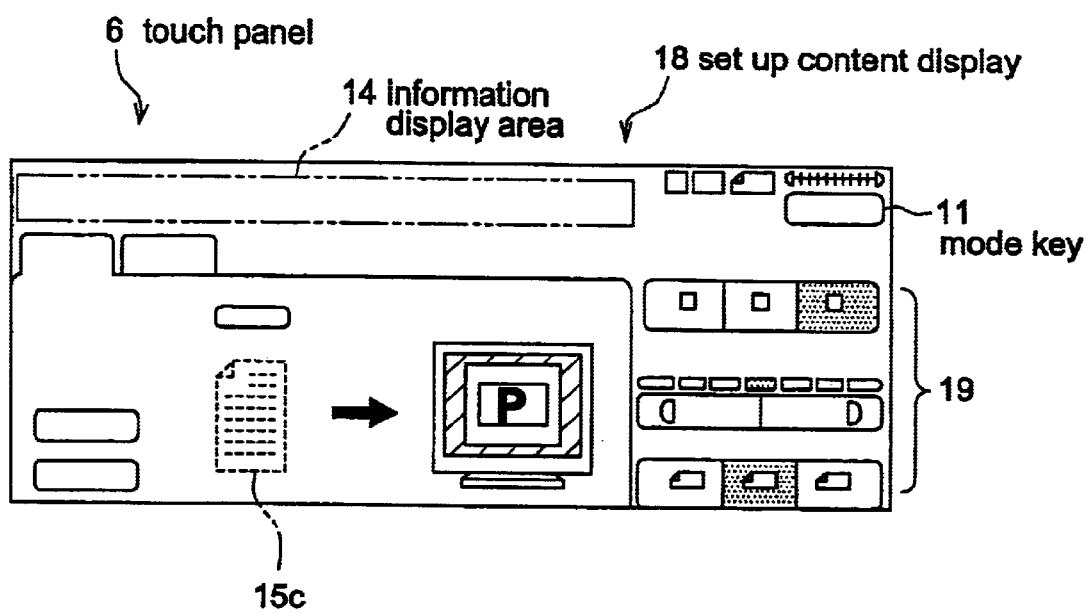
FIG. 17 illustrates a state where the document is missing in accordance with FIG. 16($a$)

When it is determined the document is not in a portrait direction at step ST82, the control proceeds to step ST84, since it indicates that the document is in a landscape direction. At step ST84, at a predetermined location in touch panel 6 illustrated in FIG. 16(b), document image 15b and forwarding image 17b indicating a landscape direction are displayed, which completes the document direction display process. Also, when it is determined that a document is not set at step ST81, the control proceeds to step ST85, to display missing document image 15c indicating the missing document in gray color as illustrated in FIG. 17, which completes the document display process.

Accordingly, since the display is performed by matching the display with the document direction prior to a transmission, it is possible to prevent a situation where a user discovers that the document has a wrong direction only after seeing the transmission result. In particular, when the direction of a forwarding image is wrong, it is possible to instantly find out how to correct the set document, thereby easily preventing a scanning error using the multifunctional printer as a scanner.

When the document displaying process is completed, control proceeds to step ST3 of FIG. 3. At step ST3, it is checked whether a start key (SK of FIGS. 16(a) and (b)), for example, located at a separate location from touch panel 6 of the operation panel 5, is pressed. When it is determined that the start key SK has not been pressed, the control proceeds to step ST4. When it is determined that the start key SK has been pressed, the control proceeds to step ST5.

At step ST4, it is checked whether mode key 11 is pressed. Since the screen at step ST4 is illustrated in FIG. 16, the controls returns to step ST1 to go back to the destination process mode, when it is determined that mode key 11 is pressed. When it is determined that mode key 11 is not pressed, the control returns to step ST2 to repeat steps ST2 and 3.

Figure 16A:
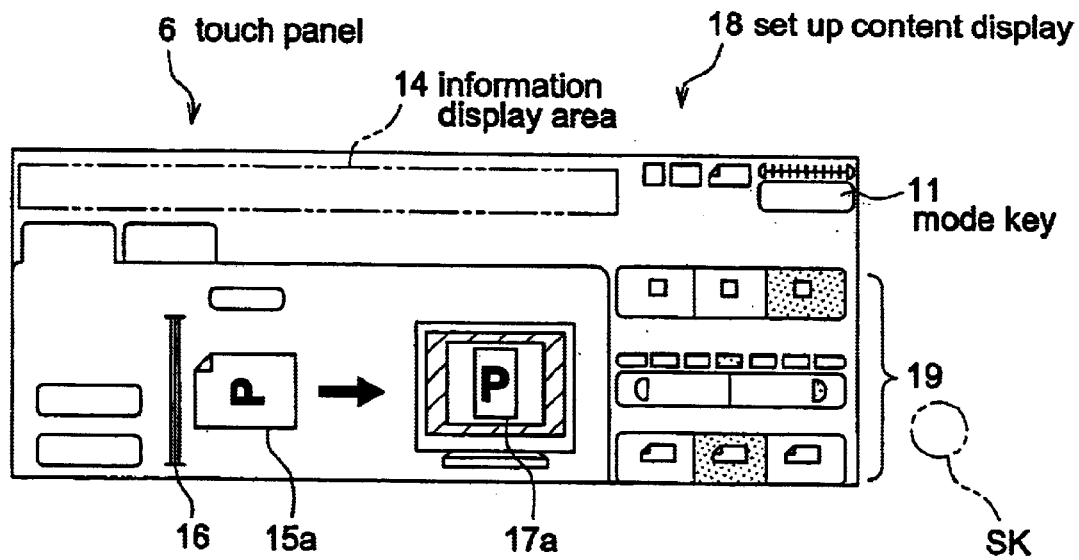
FIG. 16($a$) illustrates a display for scanning a document in a portrait direction.
Figure 18A:
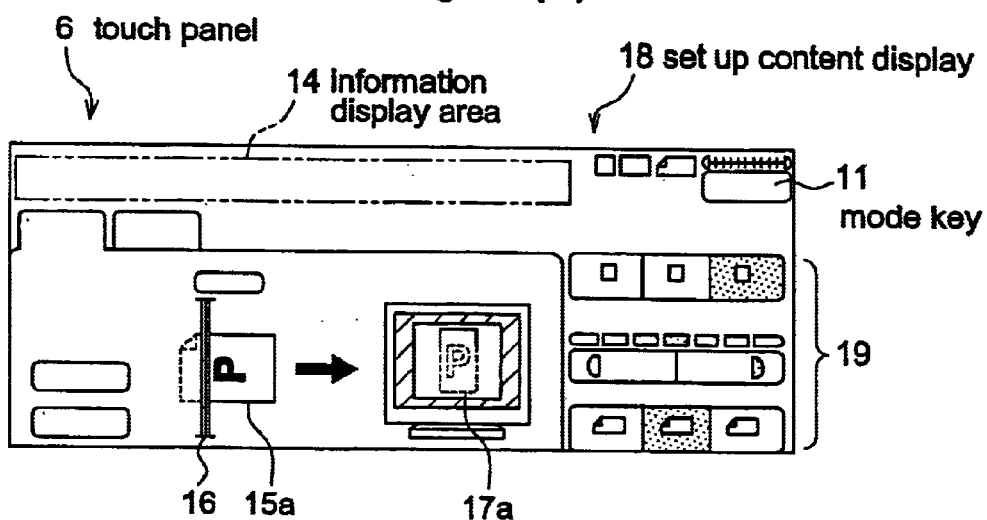
FIG. 18($a$) illustrates a state where one third of a document is scanned.
Figure 18B:
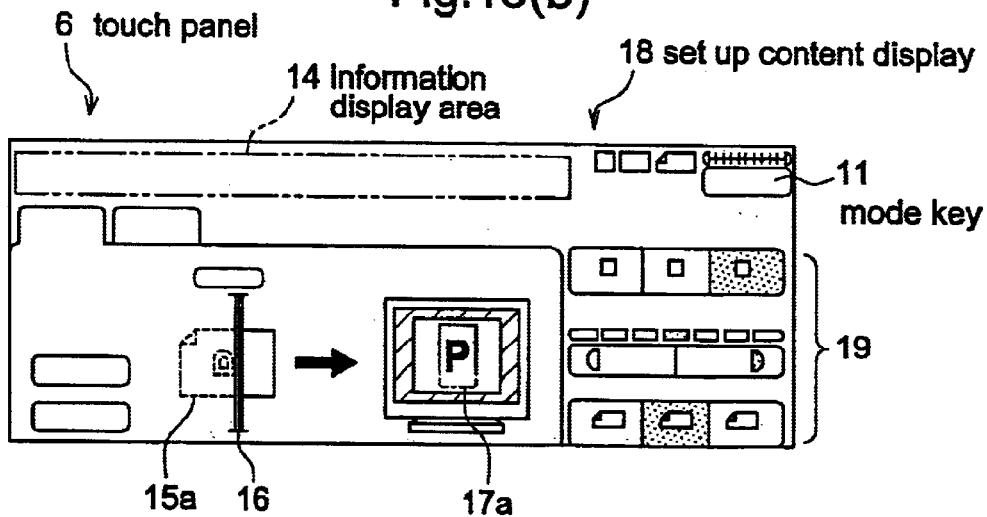
Figure 18C:
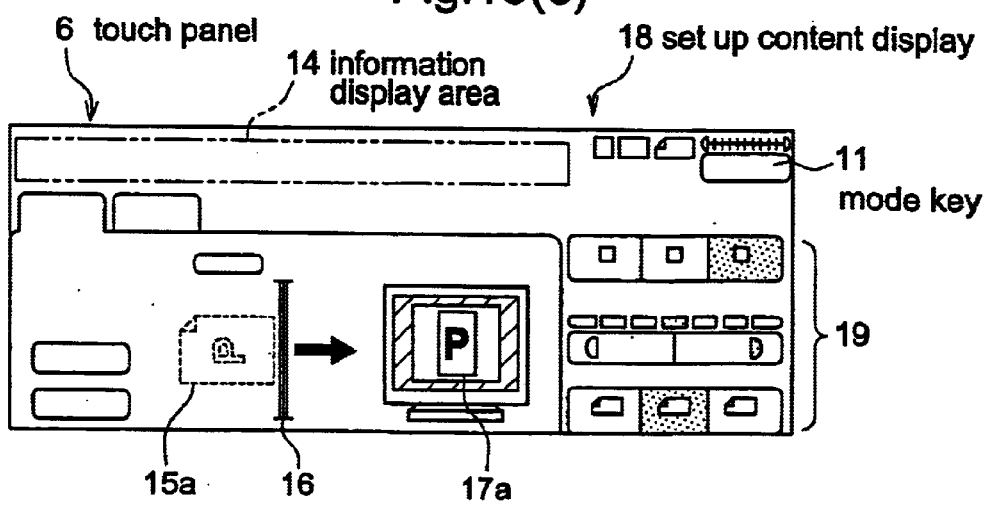

At step ST5, a process for forwarding and forwarding status display is performed. When the start key SK is pressed at step ST3, a scanning process is started, and its procedure status is displayed as illustrated in FIG. 18. FIG. 18(a) illustrates a state where about one third of the document in FIG. 16(a) is scanned. FIG. 18(b) illustrates a state where about two thirds of the document is scanned, while FIG. 18(c) illustrates a state where the entire document is scanned.

Figure 9:
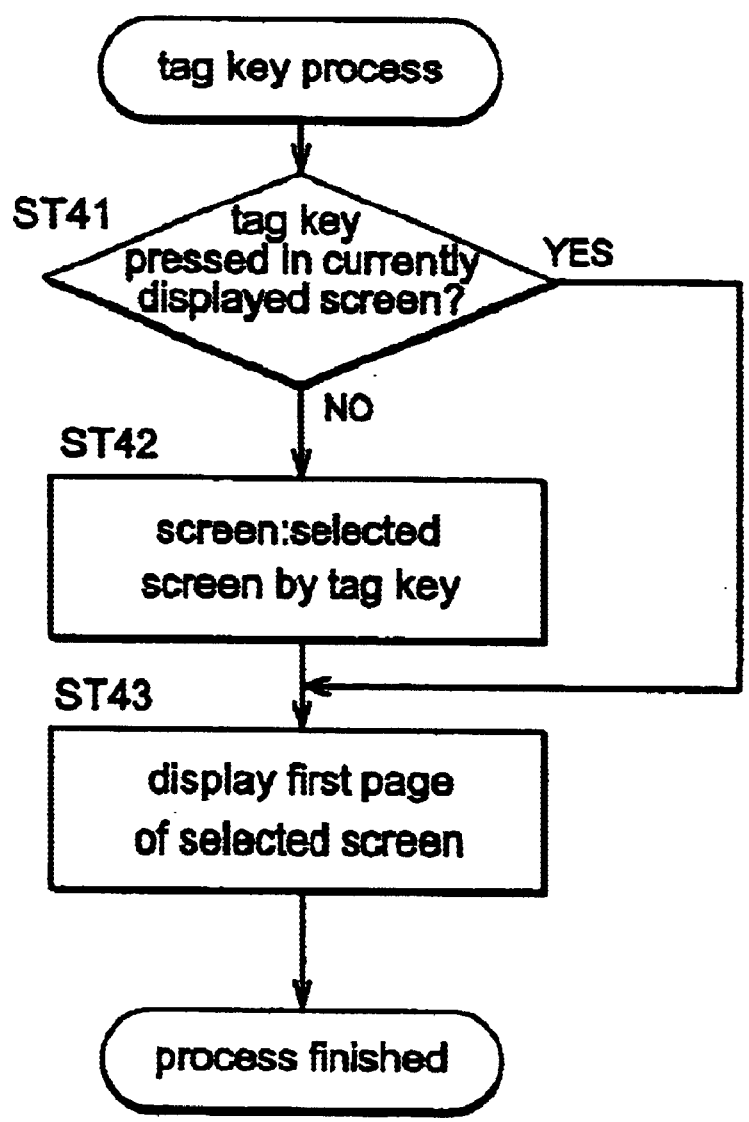
FIG. 9 illustrates a tag key process.
Figure 10:
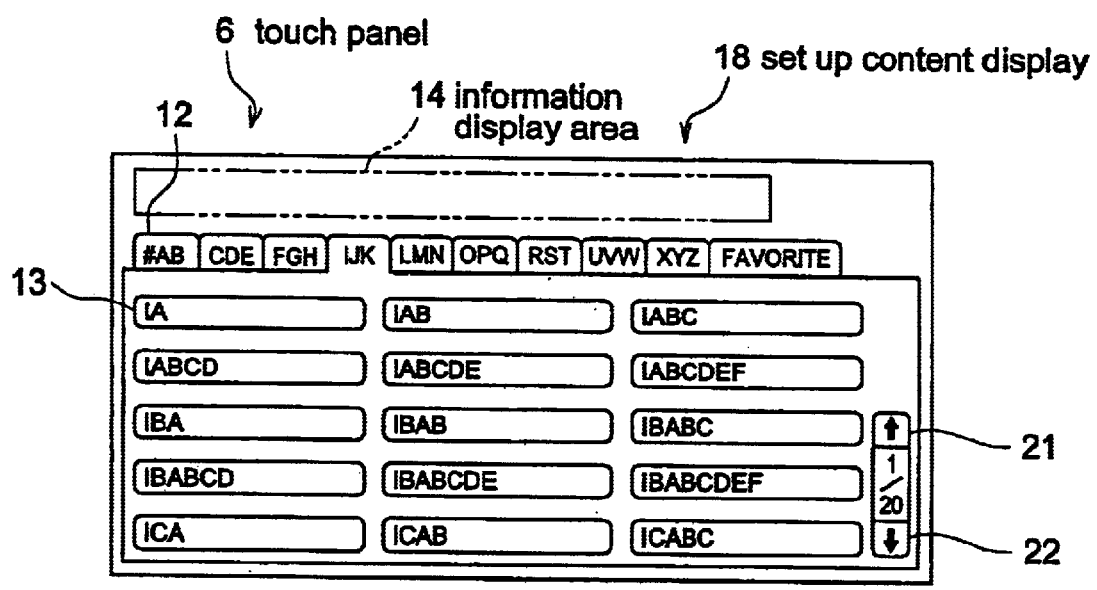
FIG. 10 illustrates a destination screen.

The example in FIG. 9 illustrates a state where scanner head image 16 moves over document image 15a according to the scanner procedure status. The scanned part corresponding to document image 15*a* is shown faded. Also, a status of forwarding to a PC is illustrated on a screen of the PC image next to the document image, using forwarding document image 17*a* in a portrait direction, by reflecting the forwarded amount with increased darkened parts in the forwarding image 17*a*. When the document is in the landscape direction, the forwarding image is also displayed in the landscape direction.

Accordingly, since the scanning and forwarding status can be viewed as animation, it is possible to easily determine how the image with confirmed document direction is being forwarded, thereby reassuring the operator. Especially this invention is effective when multifunctional printer 1 and a PC are distantly located from each other.

At step ST6, it is checked whether the forwarding process is completed. When the forwarding process is not complete, the control returns to step ST5 and continues forwarding and displaying the forwarding status. When it is determined that the forwarding process is complete at step ST6, the control returns to step ST1. Since the screen is switched from the forwarding screen of FIG. 18(*c*) (document direction display screen) to the destination screen of FIG. 5, upon completing the forwarding process, the operator is notified about the completion of the forwarding process by the change in the screen itself, and the operator can securely recognize whether the scanned image is still being forwarded or the forwarding process is complete. Since the screen changes upon completing the forwarding process, the operator can securely be notified about when the forwarding process is completed. Also, since it is not necessary to manually switch the screen back to the destination screen upon completing the forwarding process, the operator can immediately proceed to select the next destination.

In addition, touch panel 6 screen includes setup content display 18, as illustrated in FIG. 16(*a*), that displays setup contents mode as the third screen, at an upper right corner in the figure. This setup content display 18 constantly displays each setup item set by mode setter 19, which is provided below setup content display 18 in the figure. Setup items can include information such as resolution, character/photograph, and density, and mode setter 19 has switches displayed for setting up the individual setup items.

Accordingly, since setup content display 18 displays necessary information (mode setup items) at every screen, it is possible to eliminate the bother of switching the screen whenever the information needs to be confirmed. Also, even when the destination screen of FIG. 5 is opened for selecting a destination, the mode setup status can be confirmed by setup content display 18. Therefore, it is not necessary to switch the screen to the document direction display screen of FIG. 16. When the image can be forwarded to the destination with the displayed mode setup, the destination can be selected at the destination screen, thereby eliminating the bother of confirming the mode, by switching the screen into the document direction display screen.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2002-060790 filed on Mar. 6, 2002, entire content of which is expressly incorporated by reference herein.

What is claimed is:

1. A multifunction apparatus having at least one of the functions of a scanner and a facsimile, the multifunction apparatus comprising:

a scanner configured to scan an image;

a display configured to display a plurality of destination screens in a plurality of layers, each destination screen including a plurality of destination selection pages, each destination selection page including at least one destination select key for designating a destination of the scanned image, each destination screen including a page scroll key for scrolling a plurality of destination selection pages; and a controller configured to control the destination select key and the page scroll key;

wherein when said display displays a first page of the destination select pages on a destination screen, and when the page scroll key scrolls a previous page of the first page of the destination select pages, said controller replaces the currently displayed destination screen with a different destination screen.

2. The multifunctional printer multifunction apparatus according to claim 1, wherein said display displays tags which are provided with the destination screens, each said tag being associated with a respective said destination screen;

wherein when one of the tags is designated, said controller retrieves a destination screen associated with the designated tag, to display the associated destination screen on the display.

3. A multifunction apparatus having at least one of the functions of a scanner and a facsimile, the multifunction apparatus comprising:

a scanner configured to scan an image;

a display configured to display a plurality of destination screens in a plurality of layers, each said destination screen including a plurality of destination selection pages, each said destination selection page including destination select keys for designating a destination of the scanned image, each said destination screen including a page scroll key for scrolling a plurality of destination selection pages; and a controller configured to control the destination select key and the page scroll key;

wherein when said display displays a final page of the destination select pages on a destination screen, and when the page scroll key scrolls a next page of the final page of the destination select pages, said controller replaces the currently displayed destination screen with a different destination screen.

4. A multifunction apparatus having at least one of the functions of a scanner and a facsimile, the multifunction apparatus having a scanner configured to scan an image, destination select keys being dispalyed on a screen for designating destinations of the scanned image data, the multifunction apparatus comprising:

a display configured to display a plurality of destination screens with tags in a plurality of layers, said display displaying one of a plurality of destination select pages which includes at least one destination select key, the destination select page being included in each destination screen, each tag being associated with the each destination screen; and a controller configured to control said display to display a first page of the destination select pages of a destination screen associated with the designated tag, when one of the tags is designated.

5. A multifunction apparatus having at least one of the functions of a scanner and a facsimile, the multifunction apparatus having a scanner configured to scan an image, destination select keys being dispalyed on a screen for designating destinations of the scannned image data, the multifunction apparatus comprising:

a display configured to display a plurality of destination screens in a plurality of layers, said display displaying one of a plurality of destination select pages which includes at least one destination select key;

a memory configured to register a destination associated with a destination select key, the destination select key being displayed on a destination screen designated as a priority destination screen; and a controller configured to control said display to display the priority destination screen on the display at an initial stage, when a destination for the priority destination screen is registered in the memory.

6. The multifunction apparatus according to claim 5, wherein when a destination for the priority destination screen is not registered in the memory, said controller displays a destination screen which has at least a registered destination select key on said display.

7. A method for using a multifunction apparatus having at least one of the functions of a scanner and a facsimile, the multifunction apparatus having a scanner configured to scan an image, and further having a display for displaying destination select keys for designating destinations of the scanned image data, the method comprising:

displaying a plurality of destination screens in a plurality of layers, each destination screen including a plurality of destination selection pages, each destination selection page including at least one destination select key for designating a destination, each destination screen including a page scroll key for scrolling a plurality of destination selection pages; and controlling the destination select key and the page scroll key, wherein when a first page of the destination select pages is displayed on a destination screen, and when the page scroll key scrolls a previous page of the first page of the destination select pages, the controlling replaces the currently displayed destination screen with a different destination screen.

8. The method according to claim 7, wherein the displaying displays tags which are provided with the destination screens, each tag being associated with each destination screen;

wherein when one of the tags is designated, the controlling displays a destination screen associated with the designated tag on the display.

9. A method for using a multifunction apparatus having at least one of the functions of a scanner and a facsimile, the multifunction apparatus having a scanner configured to scan an image, and further having a display for displaying destination select keys for designating destinations of the scanned image data, the method comprising:

displaying a plurality of destination screens in a plurality of layers, each destination screen including a plurality of destination selection pages, each destination selection page including the destination select keys for designating a destination of the scanned image data, each destination screen including a page scroll key for scrolling a plurality of destination selection pages; and controlling the destination select key and the page scroll key;

wherein when a final page of the destination select pages is displayed on a destination screen, and when the page scroll key scrolls a next page of the final page of the destination select pages, the controlling displays the displayed destination screen with a different destination screen on the display.

10. A method for using a multifunction apparatus having at least one of functions of a scanner and a facsimile, the multifunction apparatus having a scanner configured to scan an image, and further having a display for displaying destination select keys for designating destinations of the scanned image data, the method comprising:

displaying a plurality of destination screens with tags in a plurality of layers, the displaying displaying one of a plurality of destination select pages which includes at least one destination select key, the destination select pages being included in each destination screen, each tag being associated with the each destination screen; and controlling the display, when one of the tag is designated, to display a first page of the destination select pages of a destination screen associated with the designated tag.

11. A method for using a multifunction apparatus having at least one of functions of a scanner and a facsimile, the multifunction apparatus having a scanner configured to scan an image, and further having a display for displaying destination select keys for designating destinations of the scanned image data, the method comprising:

displaying a plurality of destination screens in a plurality of layers, the displaying displaying one of a plurality of destination select pages which includes at least one destination select key;

registering a destination associated with a destination select key, the destination select key being displayed on a destination screen designated as a priority destination screen; and controlling the display, when a destination for the priority destination screen is registered, to display the priority destination screen on a front place at an initial stage.

12. The method according to claim 11, wherein when a destination for the priority destination screen is not registered, the controlling displays a destination screen which has at least a registered destination select key on the display.

* * * * *

UNITED STATES PATENT AND TRADEMARK OFFICE
CERTIFICATE OF CORRECTION

PATENT NO. : 6,692,167 B2
DATED : February 17, 2004
INVENTOR(S) : H. Nakadaira et al.

It is certified that error appears in the above-identified patent and that said Letters Patent is hereby corrected as shown below:

Column 11,
Line 20, "scannned" should be -- scanned --.

Signed and Sealed this

Twenty-third Day of November, 2004

JON W. DUDAS
*Director of the United States Patent and Trademark Office*